US006886534B2

(12) United States Patent
Rodriguez-Amaya et al.

(10) Patent No.: US 6,886,534 B2
(45) Date of Patent: May 3, 2005

(54) METHOD FOR LIMITING THE MAXIMUM INJECTION PRESSURE OF MAGNET-CONTROLLED, CAM-DRIVEN INJECTION COMPONENTS

(75) Inventors: Nestor Rodriguez-Amaya, Stuttgart (DE); Uwe Schmidt, Vaihingen/Ensingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/448,026

(22) Filed: May 30, 2003

(65) Prior Publication Data

US 2004/0025844 A1 Feb. 12, 2004

(30) Foreign Application Priority Data

May 31, 2002 (DE) ........................................ 102 24 258

(51) Int. Cl.[7] ........................ F02M 33/04; G01D 18/00; G01M 19/00

(52) U.S. Cl. ....................... 123/446; 73/119 A; 73/1.25

(58) Field of Search .......................... 123/446; 73/1.01, 73/1.05, 1.16, 1.57, 1.79, 118.1, 119 A

(56) References Cited

U.S. PATENT DOCUMENTS 4,759,224 A * 7/1988 Charbonneau et al. ... 73/862.31
4,949,904 A * 8/1990 Bata et al. ..................... 239/5
5,144,977 A * 9/1992 Eggerton et al. ........... 137/554
6,311,553 B1 * 11/2001 Schoffel et al. ........... 73/119 A
6,397,655 B1 * 6/2002 Stephenson ................. 73/1.57
6,470,281 B1 * 10/2002 Merz ........................... 702/38
6,561,164 B1 * 5/2003 Mollin ....................... 123/446
6,631,633 B1 * 10/2003 Garg et al. .................. 73/1.57
6,705,294 B2 * 3/2004 Shinogle ..................... 123/486
6,712,045 B1 * 3/2004 McCarthy, Jr. .............. 123/456
6,748,928 B2 * 6/2004 Shingole ..................... 123/480

* cited by examiner

*Primary Examiner*—Thomas Moulis
(74) *Attorney, Agent, or Firm*—Ronald E. Greigg

(57) ABSTRACT

A method for limiting the maximum allowable operating pressure at a cam-driven injection component, which component is actuatable by a magnet valve assembly. After assembly a magnet valve it is operated at a pressure source in the context of a function test, and at least one operating parameter defining a critical operating state is ascertained at which the valve just barely opens in response to a hydraulic force $F_3$. The operating parameter ascertained is delivered to the respective magnet valve assembly and is written into a function control unit for individual triggering of each magnet valve assembly with its own operating parameter.

20 Claims, 3 Drawing Sheets

METHOD FOR LIMITING THE MAXIMUM INJECTION PRESSURE OF MAGNET-CONTROLLED, CAM-DRIVEN INJECTION COMPONENTS

BACKGROUND OF THE INVENTION

1. Field of the Invention

In self-igniting internal combustion engines, injection systems of many various designs are presently in use. Along with distributor injection pumps, reservoir-type injection systems with a high-pressure reservoir (common rail) are used as injection systems, as are unit injector systems (UIS) and pump-line-nozzle injection systems (UPS). Distributor injection pumps, unit injector systems (UIS) and pump-line-nozzle systems (UPS) are cam-driven injection systems, in which via a cam coupled in articulated fashion to the piston, a reciprocating motion is impressed upon a piston that dips into a pump work chamber. If magnet valves are used for controlling the injection event at the aforementioned cam-controlled injection components, then assurance must be provided that excessively long triggering times during which excessively high operating pressures arise, cannot occur.

2. Description of the Prior Art

European Patent Disclosure EP 0 178 427 B1 has an electrically controlled fuel injection pump for internal combustion engines as its subject. The electrically controlled fuel injection system can be used particularly with a Diesel engine. It includes at least one pump piston, which is driven with a constant stroke and defines a pump work chamber, and in the pumping stroke, the pump piston pumps the fuel, delivered at inlet pressure to this pump work chamber by a feed pump, to an injection nozzle at injection pressure. The pumping of fuel continues until a valve member of an overflow valve, actuated by an electrical actuator, blocks the flow of the fuel that otherwise spills over from the pump work chamber to a low-pressure chamber via a overflow conduit. The fuel injection pump further includes structural spaces in the overflow valve that receive a core and a conductor coil as well as an armature, and also includes a pressure chamber surrounding the valve member in the region of one end portion. A guide shaft is guided on the valve member in a guide bore and is prestressed by a compression spring. At the transition from the pressure chamber to a first portion of the overflow conduit that communicates with the low-pressure chamber, there is a conical valve seat that can be closed by a conical closing face. The overflow valve is inserted between this first portion and a second portion of the overflow conduit that connects the pressure chamber permanently to the pump work chamber. The valve member of the overflow valve opens inward, toward the pressure chamber that can be put at injection pressure. The cone angle $\alpha$ of the radial conical closing face is larger than the cone angle $\beta$ of the associated valve seat, which widens conically toward the pressure chamber; with an adjacent cylindrical jacket face, on the end portion of the valve member, the closing face forms a precisely defined sealing edge. The conical valve seat has a narrow, hydraulically operative seat face that in the closed state of the overflow valve is closed by the closing face of the valve member and that is defined on the inside by the diameter of a flow opening in the first portion of the overflow conduit. The seat angle difference $\alpha$-$\beta$ of the two cone angles $\alpha$, $\beta$ is very small. The overflow valve is a needle valve that is open when without current, and whose valve member is embodied as a valve needle that is prestressed in the opening direction by the compression spring. On the face end, this valve needle has a needle tip, carrying the closing face, on its end portion remote from the actuator. The end portion is connected to the actuator via the guide shaft that is guided with narrow play in the guide bore. Between the guide shaft and the jacket face of the needle tip adjacent to the closing face, there is an annular-groove like constriction that enlarges the volume of the pressure chamber. The structural spaces that receive the core with the conductor coil and the armature communicate with the low-pressure chamber via a relief bore. With a rotationally symmetrical extension, which on its face end has a first spring abutment for a compression spring, the needle tip defined radially by the sealing edge protrudes into the first portion of the overflow conduit, communicating with the low-pressure chamber. A second spring abutment for the compression spring is inserted into the first portion of the overflow conduit, and the narrow, hydraulically operative seat face covered by the closing face at the needle tip of the valve member is only a few tenths of a millimeter wide. The diameter of the sealing edge at the end portion of the valve member is equal to the guidance diameter of the guide shaft, or is only slightly smaller than that diameter.

In the known embodiment, the switching magnet valves include a pressure step, which is defined by a diameter difference between the valve needle guide and a seat. By exerting a hydraulic force on the pressure step, the opening motion of the injection valve member, embodied as a nozzle needle, is reinforced. The manufacture of the pressure step in switching magnet valves involves tolerances. Completed components can vary sometimes considerably, within specified production tolerances, from one example to another. The result is variation in terms of the tolerance-dependent functional parameters from one component to another. This tolerance-dependent deviation of the functional parameters is thus also reflected in a deviation in the maximum operating pressure at which a control valve will open. Under some circumstances, this can happen at various relatively large values, so that a reliable, adequate protective function can be achieved only with difficulty.

OBJECT AND SUMMARY OF THE INVENTION

With the method proposed according to the invention, in cam-driven injection components, a maximum allowable operating pressure can be maintained, and exceeding such a pressure can be reliably prevented. The proposed method takes into account the tolerances in components that result for specific examples in production, such that in the context of a function test, example-specific parameters, such as holding current values and characteristic current values ascertained from them by correlation or extrapolation, are ascertained. The parameters ascertained for specific examples are ascertained in the injection systems that are later installed in internal combustion engines and are thus available for use in control units.

Within the context of a function test of the installed injection components, these components can either be tested with a well-defined operating pressure level, or under operating conditions. In this function test, the hydraulic force at which a valve, embodied for instance as a magnet valve, inside an injection component is just barely still closed is ascertained. The magnet force to be generated by a magnet for maintaining the closing position is equivalent to a certain holding current. If the force acting on the magnet valve in the opening direction exceeds this magnet force, then the automatic opening of this specific valve occurs. The holding current contacting the magnet valve determines the maximum allowable operating point attainable at this specific injection component, a component that is subject to tolerances, i.e. variations from one manufactured component to another. Since the holding current is ascertained for individual examples in the function test, production tolerances, which can vary within a predetermined tolerance range from one example to another, are taken into account for each example.

The holding current value ascertained for individual examples can be encoded (for instance via laser coding) at the particular function-tested injection component. When the function-tested injection component has been installed in the engine, the encoded information for the holding current value, or characteristic current values derived from it, can be written into a control unit of the engine.

As a rule, the magnet valves of injection components in internal combustion engines are triggered via end stages. The end stages can in turn be triggered via the engine control unit associated with the engine. A number of injection components corresponding to the number of cylinders in the engine are installed in the engine. Their holding current values, which can certainly differ from one another, or characteristic current values derived from them can be written into engine control unit, so that the control unit offers each injection component its own individual holding current value. For representing variable holding current values, a plurality of holding current values/characteristic current values can be represented at the end stages of the engine control unit.

With the proposed method, the magnetically generated retention force of an injection component, and the requisite value for this of a holding current can be ascertained for each example. This value represents a measure of, the maximum allowable operating pressure of the cam-driven injection component and protects it against pressures that exceed the intended maximum allowable pressure; this maximum allowable pressure can vary from one end stage to another, because of production tolerances. The various end stages or the end stage that triggers the injection components include hard-wired electronic components and associated microprocessors ($\mu$P); as a rule, the control is done in the engine control unit via data processing programs (software).

BRIEF DESCRIPTION OF THE DRAWINGS

The invention will be better understood and further objects and advantages thereof will become more apparent from the ensuing detailed description taken in conjunction with the drawings, in which.

DESCRIPTION OF THE PREFERRED EMBODIMENTS

Figure 1:
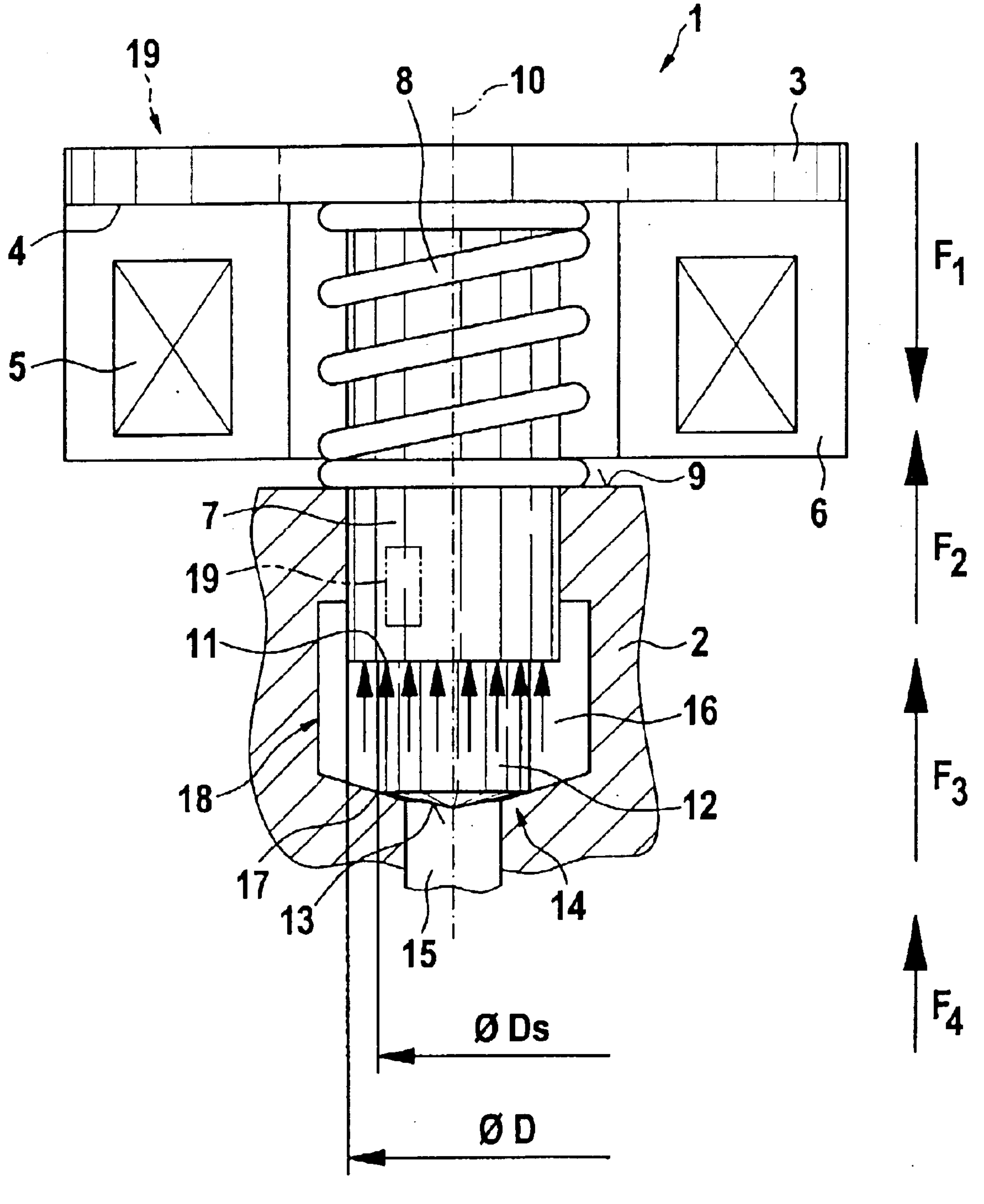
FIG. 1 shows in a rough schematic the design parameters for a pressure step of a magnet valve assembly for an inward-opening valve.

A cam-driven injection component, such as a unit injector configuration, a distributor injection pump, or a pump-line-nozzle system can for instance be triggered by means of the magnet valve assembly 1 shown as an example in a rough schematic in FIG. 1. The triggering of a magnet valve assembly 1 shown schematically here is done for instance via an end stage of an engine control unit of an internal combustion engine of a motor vehicle.

The magnet valve assembly 1 shown is received in a housing 2 of a cam-driven injection component and includes an armature plate 3, which is secured to an armature bolt 7. An underside 4 of the armature plate 3 faces a magnet coil 5, which can be surrounded by a magnet core 6. Supplying current to the magnet coil 5, shown schematically here in an embodiment as a ring magnet, can impress a magnet force $F_1$ on the armature plate 3 and accordingly on the armature bolt 7. The armature bolt 7 of the magnet valve assembly 1 in the schematic illustration in FIG. 1 is surrounded by a spring element 8, which is braced on one end on the underside 4 of the armature plate 3 and on the other on a stop 9 provided on the housing 2.

A pressure step 11 can be embodied on the armature bolt 7, and this bolt is embodied rotationally symmetrically to the axis of symmetry 10. A hydraulic force $F_3$ oriented counter to the magnet force $F_1$ engages the pressure step 11 of the armature bolt 7 of the magnet valve assembly 1 of FIG. 1. The pressure step 11 of the magnet valve assembly 1 is defined by an outer diameter D and an inner diameter $D_S$ and is embodied as an annular hydraulic face. Below the pressure step 11, the armature bolt 7 is continued in the form of an armature bolt extension 12, on whose end opposite a bore 15 a sealing face in the form of a conical face 13 is disposed. The conical face 13 on the armature bolt extension 12 cooperates with a sealing seat 14, which is embodied in the housing 2 of the cam-driven injection component. Via a bore, not shown, a hollow chamber 16 surrounding the pressure step 11 of the armature bolt 7 can be acted upon by a pressure source —represented by the arrow 18. Either a pressure source that generates a defined pressure level, or a pressure source of the kind with which the pressures occurring in operation of an internal combustion engine can be realized, can be used as the pressure source 18.

Reference numeral 17 defines a seat edge of the conical face 13 of the armature bolt extension 12, with which edge the sealing seat 14 is formed on the housing 2 of the cam-driven injection component. Reference numeral 19 can be used to designate positions which can be embodied on the top of the armature plate 3 or on the circumferential face of the armature bolt 7 above the pressure step 11; in a function test of the magnet valve assembly 1, certain operating states of the magnet valve assembly 1 can be imposed at these positions in encoded form in a way specific to each example. For the sake of advantageously being able to read out the positions 19, they can be applied to the surface of parts located on the outside as well, such as the outer face of the magnet valve housing 2.

$F_1$ designates the magnet force with which the armature plate 3 of the magnet valve assembly 1 can be attracted, given a suitable supply of current to the magnet coil 5 inside the magnet core 6, and with which magnet force the sealing seat 14 can be kept closed relative to the bore 15. $F_2$ is the spring force that can be brought to bear by the spring element 8 surrounding the armature bolt 7 and that acts counter to the magnet force $F_1$. $F_3$ indicates the hydraulic force, which likewise counteracting the magnet force $F_1$ engages the annularly embodied hydraulic pressure step 11 at the armature bolt 7. $F_4$ is a sealing force, with which the sealing seat 14 in the housing 2 of the cam-driven injection component can be sealed off from the pressure force of the pressure source 18.

For the design point of the magnet valve assembly 1, shown in FIG. 1 taking an inward-opening magnet valve as an example, the applicable equation formula is:

$$F_3 > F_1 - F_2 - F_4. \qquad (1)$$

If $p_{max} \cdot A_{DS} \hat{=} F_3$, and if $F_4 = p_{set} \cdot A_{seat}$, then from the above equation, it follows that:

$$p_{max} \cdot A_{DS} > F_1 - F_2 - p_{set} \cdot A_{seat}. \qquad (2)$$

Taking into account the geometry of the pressure step 11 defined by the diameters D and $D_S$, from the relationship given above in equation (2), it follows that $$p_{max} \cdot \pi (D^2 - D_S^2)/4 > F_1 - F_2 - p_{set} \cdot A_{seat}. \qquad (3)$$

With the aid of equation (3), the selection of the diameters D and $D_S$, that is, the determination of the outer diameter D of the pressure step 11 and the determination of its inside diameter $D_S$, is possible.

Experience has shown that the components of a magnet valve assembly 1 are subject to deviations within the specified production tolerances, and these deviations can cause a deviation in the measurements from one example of a magnet valve assembly 1 to another, particularly at an armature bolt 7 which as shown in FIG. 1 is provided with a pressure step 11. A deviation in the dimensions in terms of the inside diameter $D_S$ and outside diameter D of the pressure step 11 also results in a deviation in a maximum allowable operating pressure of the magnet valve assembly shown in FIG. 1, since because of the tolerances in the diameters listed, the hydraulically effective area of the pressure step 11 in the lower region of the armature bolt 7 can vary in size at the transition to the armature bolt extension 12. Since the tolerance is within a predetermined production tolerance, a reliable and adequate protective function is variable, because the hydraulically effective area at the pressure step 11 is also variable one magnet valve assembly 1 to another magnet valve assembly 1.

Figure 2:
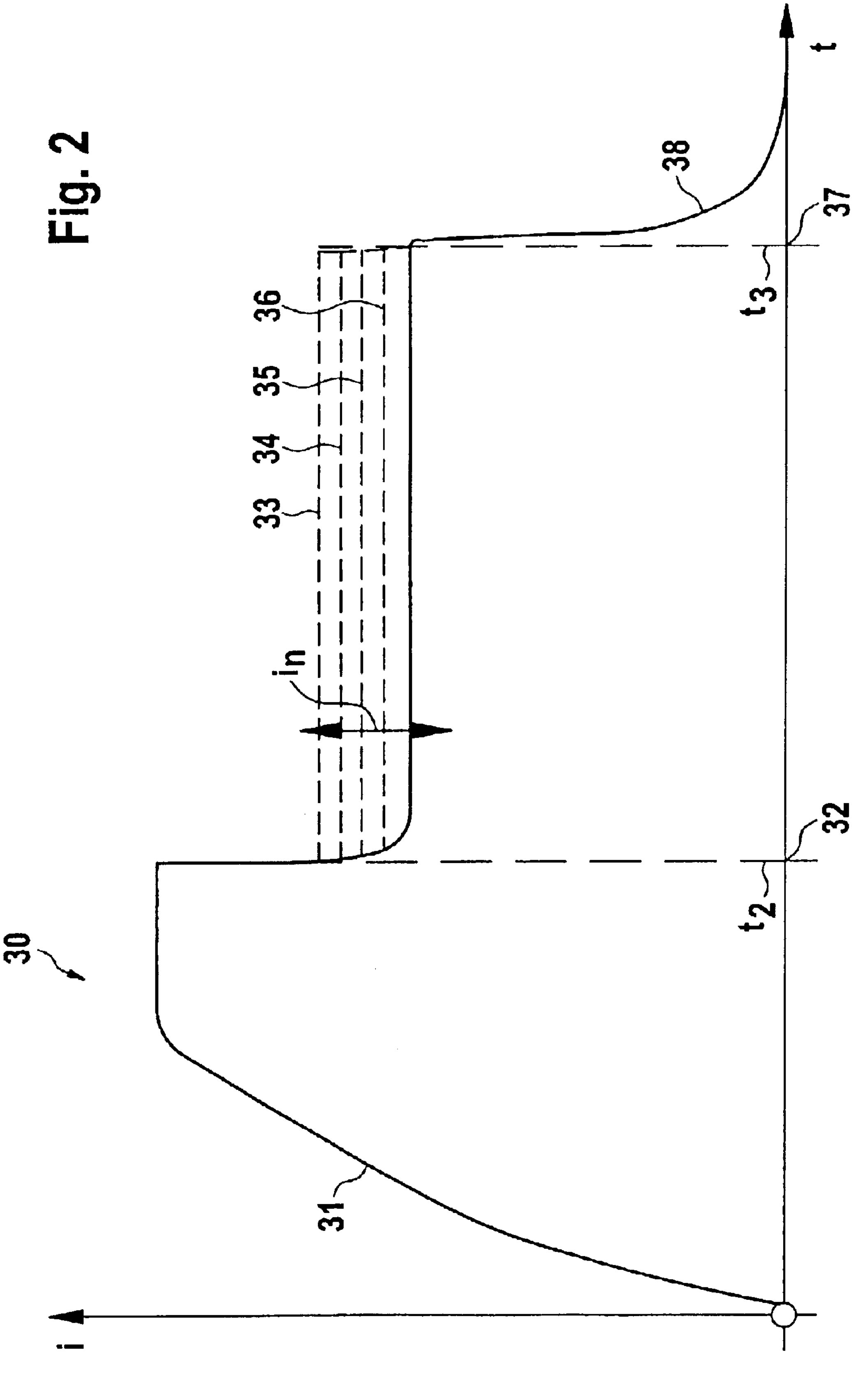
FIG. 2 compares the holding current values during operation that can be attained with one end stage.

FIG. 2 is a graph that shows holding current values ascertained for specific examples and that are to be imposed via an end stage, which triggers the magnet valve assembly 1, of a function control unit of an internal combustion engine.

The magnet valve assembly 1 shown in FIG. 1, after the manufacture of its parts has been completed and after it has been assembled and after a preadjustment, is as a rule subjected to a function test. The function test can be done either at a pressure source 18 that imposes a well-defined pressure level or alternatively at a pressure source 18 of the kind that simulates the pressures that occur in operation of an internal combustion engine.

In the holding current course 30 in FIG. 2, current is supplied in the context of the function test to a magnet valve assembly 1, that is, its magnet coil 5, that is mounted in a cam-driven injection component. First, a current rise 31 occurs. At a time $t=t_2$, which is identified in FIG. 2 by reference numeral 32 on the time axis, the lowering of the holding current i of the magnet coil 5 takes place, to a holding current level at which the magnet valve assembly 1 remains closed, and precisely to such an extent that the magnet valve assembly 1 opens automatically because of the predominance of the hydraulic force $F_3$ that engages the pressure step 11 between the armature bolt 7 and the armature bolt extension 12. Since the magnet valve assembly 1 is in its assembly position in which it is located in the cam-driven injection component, the spring force $F_2$ generated by the compression spring 8 and the requisite sealing force $F_4$ at the sealing seat 14 of the magnet valve assembly 1 upon lowering of the holding current level as indicated by the holding current course 30 shown in FIG. 2 are taken into account. For the particular magnet valve assembly 1 that has just been subjected to the function test, a holding current 33 ensues for this specific example; this holding current serves as an operating parameter that defines a critical operating state. This holding current value, identified by reference numeral 33 in FIG. 2, can be used directly as an operating parameter, defining a critical operating state, of the magnet valve assembly 1, on the one hand.

On the other hand, it is also possible, by correlation or extrapolation from the ascertained holding current value 33, to generate a corresponding characteristic current value which for this specific magnet valve assembly 1 enables an automatic opening of the magnet valve assembly beyond a maximum allowable operating pressure, within a cam-driven injection component, such as a distributor injection pump. Thus the maximum allowable operating pressure occurring at a cam-driven injection component is preset; higher operating pressures are prevented in this kind of function-tested magnet valve assembly 1 by means of an automatic opening of the magnet valve assembly 1. Thus if higher pressures occur, the cam-driven injection component does not suffer any damage. The operating parameter ascertained for the specific magnet valve assembly 1, such as the holding current value 33 ascertained, which defines a critical state, can be applied to the magnet valve assembly 1 via coating methods. As can be seen from FIG. 1, the ascertained operating parameter can be applied for instance to the top of the armature plate 3 at some suitable point 19, or to some other suitable point of the injection component, such as the external side of the magnet valve housing 2, by means of laser encoding. Thus the holding current value for this specific example, which represents one operating parameter of a magnet valve assembly 1, can be associated with that particular magnet valve assembly 1, and upon installation of the magnet valve assembly 1 in a cam-driven injection component, or upon installation in the self-igniting engine, this operating parameter can be written into its function control unit 40 (see FIG. 3).

For a further magnet valve assembly 1 that is subjected to a function test, it is possible for instance, after the lowering of the holding current level at time $t=t_2$ (reference numeral 32), for a lower holding current level 34 to become established. The lower holding current value—see reference numeral 34 in FIG. 2—is due to the fact that for this further example of a magnet valve assembly 1, the hydraulically effective area of the pressure step 11, because the production of the outer diameter $D_S$ and inner diameter D of the pressure step 11 involve tolerances, is less than for the magnet valve assembly 1 at which the holding current value i indicated by reference numeral 33 has been ascertained. At time $t=t_3$—see reference numeral 37 in FIG. 2—the magnet valve assembly 1 subjected to the function test, that is, its magnet coil 5, no longer receives current, and a decrease in the current course of the current supplied to the magnet coil 5 of the magnet valve assembly 1 ensues, as represented by the curve course 38.

The other holding current levels 35 and 36, shown in dashed lines in FIG. 2 and extending horizontally, represent the operating parameters, ascertained in the function test, which magnet valve assemblies 1 as shown in FIG. 1, which are subject to tolerances, have and which, taking into account the production tolerances of the pressure step 11, can result in various holding current levels for the individual magnet valve assemblies 1. The double arrow marked $i_n$ in FIG. 2 designates the deviation, specific to a given example, in the values for the holding current level of in this case four magnet valve assemblies 1 of the kind shown in FIG. 1 that are subjected to a function test. From the comparison shown in FIG. 2 of the various holding current levels 33, 34, 35, and 36, it can be seen that the individual magnet valve assemblies 1, which are used for instance in cam-driven injection components of a 4-cylinder, self-igniting internal combustion engine, can certainly have different values that define a critical state, such as a maximum allowable operating pressure.

The individual holding current levels 33, 34, 35 and 36, ascertained for a specific example, can now be associated with, or in other words encoded on, the individual magnet valve assemblies 1 subjected to the function test, at the faces marked with reference numeral 19, that are implanted in an accessible location to be readable from the outside.

Figure 3:
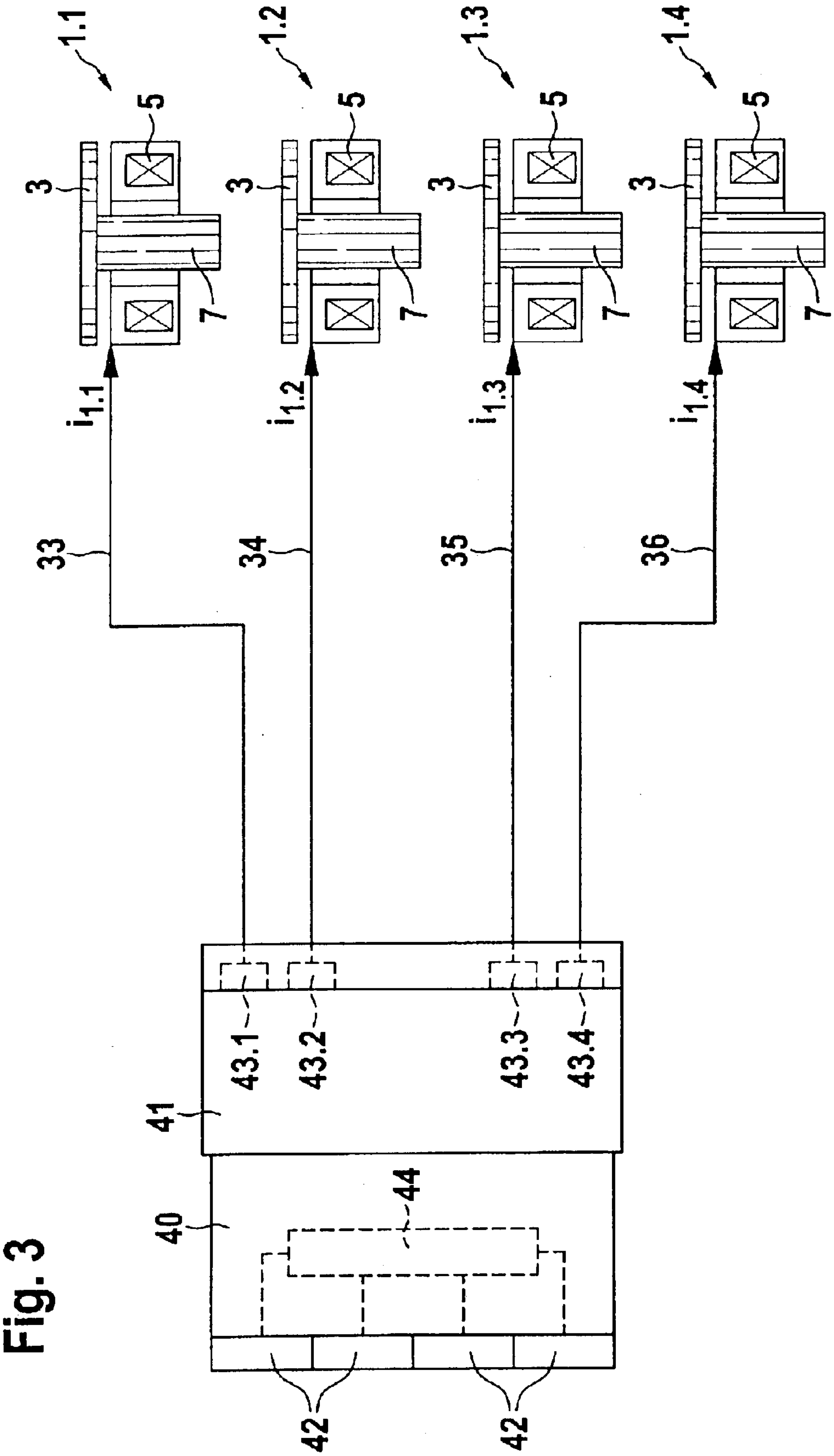
FIG. 3 shows the layout of an engine control unit with a downstream end stage for triggering four magnet valves, for instance, in a 4-cylinder, self-ignited internal combustion engine.

FIG. 3 shows the triggering of a number of magnet valve assemblies of cam-driven injection components that can be triggered via an end stage associated with a function control unit.

Once the operating parameters such as the holding current levels 33, 34, 35 and 36 as shown in FIG. 2 have been ascertained and the particular critical operating parameter that has been ascertained has been associated with the individual magnet valve assemblies 1 as shown in FIG. 1, the individual operating parameters, ascertained for specific examples, in the form of holding current values or characteristic current values 33, 34, 35, 36 ascertained from them are written into a function control unit 40. For that purpose, the function control unit 40 includes a memory component 44. Via input ports 42, the various individual holding current levels 33, 34, 35 and 36 that have been ascertained in the course of the function test can be written into the memory 44 of the function control unit 40. Instead of four individual input ports 42 as shown in FIG. 3, the holding current levels 33, 34, 35 and 36 can also be written sequentially at a single input port 42 embodied on the function control unit 40. The function control unit 40, which in FIG. 3 is shown merely in block form, can be followed downstream by an end stage 41. Instead of a single end stage 41, the function control unit 40 can also include a plurality of end stages, with which individual magnet valve assemblies 1.1, 1.2, 1.3 and 1.4 of a self-igniting internal combustion engine, which in this case includes four cylinders as an example, can be triggered.

When a single end stage 41 that can be connected downstream of a function control unit 40 with a memory 44 is used, the end stage 41 is preferably embodied in such a way that at its output port 43, or in a plurality of output port regions 43.1, 43.2, 43.3 and 43.4, variable values of a holding current level 33, 34, 35 and 36 (see the graph in FIG. 2) can be represented. The various critical operating parameters ascertained for a specific example in the function test of each magnet valve assembly 1, such as the example-specific holding current levels 33, 34, 35 and 36 shown in FIG. 2, are known once they have been written into the memory 44 of the function control unit 40 of the engine. Via the end stage 41 of the function control unit 40, it is for instance possible, via an output port region 43.1, to transmit a holding current level $i_{1.1}$ (see reference numeral 33 in FIG. 2) to a first magnet valve assembly 1.1, which can have the same structure as the magnet valve assembly 1 shown in FIG. 1. The holding current $i_{1.1}$ is impressed on the magnet coil 5 that surrounds the armature bolt 7 of the magnet valve assembly 1.1. By impressing the holding current level $i_{1.1}$ upon the magnet coil 5 of the first magnet valve assembly 1.1, the maximum attainable operating pressure of this magnet valve assembly 1.1 is limited, since if the hydraulic force $F_3$ at the pressure step 11, not shown in FIG. 3, of the armature bolt 7 is exceeded, the magnet valve assembly 1.1 opens automatically. The components of the cam-driven injection component at which the first magnet valve assembly 1.1 is used are thus protected against excessively high pressures.

Via the second output port region 43.2 of the end stage 41, the magnet coil 5 of a further, second magnet valve assembly 1.2 can have a second holding current level $i_{1.2}$ (see reference numeral 34 in FIG. 2) that has been determined for a specific example imposed upon it. This holding current level can differ from the holding current level at which the magnet coil 5 of the first magnet valve assembly 1.1 is supplied with current. Analogously, via the further output port regions 43.3 and 43.4 of the end stage 41 of the function control unit 40, the magnet coils 5 of a third and fourth magnet valve assembly 1.3 and 1.4, respectively, can be triggered with the corresponding holding current levels $i_{1.3}$ and $i_{1.4}$(see reference numerals 35, 36 in the graph of FIG. 2).

Instead of four magnet valve assemblies 1.1, 1.2, 1.3 and 1.4, as shown in FIG. 3, for a 4-cylinder self-igniting internal combustion engine, it is possible, via the function control unit 40 shown in block form in FIG. 3, with one or more end stages 41 downstream of it, to trigger even 5, 6 or 8, or even 10, individual magnet valve assemblies, which are used in cam-driven injection components of a self-igniting engine, with their holding current levels $i_n$ that differ from one another and have been ascertained in the function test. In FIGS. 2 and 3, the function test or ascertaining of the holding current level is shown taking as an example a 4-cylinder self-igniting internal combustion engine. The function control units (engine control units) 40 of an internal combustion engine can include hard-wired electronic components and associated microprocessors ($\mu$P). The control within the function control unit 40 of an internal combustion engine is done by means of data processing programs that are stored in corresponding memory elements. By means of the function control unit 40 shown schematically in FIG. 3, which can have one or more end stages 41 downstream of it, the holding current level values 33, 34, 35 and 36, ascertained in the function test and installed in an engine, are stored in memory, so that the individual operating parameters, ascertained for specific examples in the function test and being in the form of holding current level values, can be made available to the respective magnet valve assembly 1.1, 1.2, 1.3 and 1.4. If a function control unit 40 that has one end stage 41 downstream of it is used, then this end stage is designed such that at its output port 43, or its output port regions 43.1, 43.2, 43.3 and 43.4, variable values of the holding current level $i_{1.1}$, $i_{1.2}$, $i_{1.3}$ and $i_{l.4}$, corresponding to the dashed lines marked in FIG. 2 with reference numerals 33, 34, 35 and 36, can be set.

The foregoing relates to preferred exemplary embodiments of the invention, it being understood that other variants and embodiments thereof are possible within the spirit and scope of the invention, the latter being defined by the appended claims.

We claim:

1. A method for limiting for the maximum allowable operating pressure at a cam-driven injection component, which component is actuatable by means of a magnet valve assembly (1, 1.1, 1.2, 1.3, 1.4), the method comprising the following method steps:

a) operating an assembled a magnet valve assembly (1) at a pressure source (18) in the context of a function test;

b) ascertaining for each magnet valve assembly (1), at least one operating parameter (33, 34, 35, 36) defining a critical operating state at which the magnet valve assembly (1) just barely opens in response to a hydraulic force $F_3$;

c) delivering the ascertained operating parameter (33, 34, 35, 36) to the respective magnet valve assembly (1); and d) writing the operating parameter (33, 34, 35, 36) ascertained for each magnet valve assembly (1) of an injection component for an internal combustion engine into a function control unit (40) for individual triggering of each magnet valve assembly (1.1., 1.2, 1.3, 1.4) with its own operating parameter (33, 34, 35, 36) that is ascertained for that specific example.

2. The method of claim 1, wherein the context of the function test, the magnet valve assembly (1) is acted upon by a pressure source (8) at a defined pressure level.

3. The method of claim 1, wherein in the context of the function test, the magnet valve assembly (1) is acted upon by the pressures that occur under operating conditions of the engine.

4. The method of claim 1, wherein as an operating parameter defining a critical operating state, a current value (33, 34, 35, 36) of a magnet coil (5) of the magnet valve assembly (1) is ascertained.

5. The method of claim 4, wherein the ascertaining of the operating parameter (33, 34, 35, 36) is effected by lowering the holding current level of the magnet coil (5) of the magnet valve assembly (1) down to a value at which the magnet valve assembly (1) opens automatically in response to the hydraulic force $F_3$.

6. The method of claim 5, wherein from the operating parameter in the form of the holding current level (33, 34, 35, 36), a characteristic current value is ascertained by correlation and/or extrapolation.

7. The method of claim 4, wherein the operating parameter ascertained is associated with the magnet valve assembly (1, 1.1, 1.2, 1.3, 1.4).

8. The method of claim 5, wherein the operating parameter ascertained is associated with the magnet valve assembly (1, 1.1, 1.2, 1.3, 1.4).

9. The method of claim 6, wherein the operating parameter ascertained is associated with the magnet valve assembly (1, 1.1, 1.2, 1.3, 1.4).

10. The method of claim 7, wherein the operating parameter ascertained is laser-encoded at the magnet valve assembly (1.1, 1.2, 1.3, 1.4).

11. The method of claim 8, wherein the operating parameter ascertained is laser-encoded at the magnet valve assembly (1.1, 1.2, 1.3, 1.4).

12. The method of claim 9, wherein the operating parameter ascertained is laser-encoded at the magnet valve assembly (1.1, 1.2, 1.3, 1.4).

13. The method of claim 1, wherein the operating parameter (33, 34, 35, 36) ascertained for a specific example and defining a critical operating state of a cam-driven injection component is written into a function control unit (40).

14. The method of claim 13, wherein the operating parameters (33, 34, 35, 36) are written into the function control unit (40) on the input side via read-in ports (42) and are output for specific examples of magnet valve assemblies (1.1, 1.2, 1.3, 1.4) on the output port side via output ports (43; 43.1, 43.2, 43.3, and 43.4).

15. The method of claim 14, wherein the triggering of the magnet valve assemblies (1.1, 1.2, 1.3, 1.4) of cam-driven injection components of an internal combustion engine is effected via one output port (43) of one end stage (41).

16. The method of claim 14, wherein the triggering of the magnet valve assemblies (1.1, 1.2, 1.3, 1.4) of cam-driven injection components of an internal combustion engine is effected via a plurality of output port regions (43.1, 43.2, 43.3, 43.4) of one end stage (41).

17. The method of claim 14, wherein that example-specific operating parameters (33, 34, 35, 36) that trigger the magnet valve assemblies (1.1, 1.2, 1.3, 1.4) are represented at the end stage (41), with which operating parameters magnet coils (55) of the magnet valve assemblies (1.1, 1.2, 1.3, 1.4) can be triggered individually.

18. The method of claim 1, wherein the number of operated magnet valve assemblies is not restricted to only four assemblies, but is applicable to a plurality of assemblies according to the number of cylinders of the internal combustion engine that is been operated by such an injection system.

19. The method of claim 5, wherein the number of operated magnet valve assemblies is not restricted to only four assemblies, but is applicable to a plurality of assemblies according to the number of cylinders of the internal combustion engine that is been operated by such an injection system.

20. The method of claim 14, wherein the number of operated magnet valve assemblies is not restricted to only four assemblies, but is applicable to a plurality of assemblies according to the number of cylinders of the internal combustion engine that is been operated by such an injection system.

* * * * *